US006746330B2

(12) United States Patent
Cannon

(10) Patent No.: US 6,746,330 B2
(45) Date of Patent: Jun. 8, 2004

(54) METHOD AND DEVICE FOR IMPLEMENTING A COINLESS GAMING ENVIRONMENT

(75) Inventor: Lee E. Cannon, Bozeman, MT (US)

(73) Assignee: IGT, Reno, NV (US)

(*) Notice: Subject to any disclaimer, the term of this patent is extended or adjusted under 35 U.S.C. 154(b) by 0 days.

(21) Appl. No.: 10/324,724

(22) Filed: Dec. 19, 2002

(65) Prior Publication Data

US 2003/0092486 A1 May 15, 2003

Related U.S. Application Data

(63) Continuation of application No. 09/400,378, filed on Sep. 21, 1999.

(51) Int. Cl.[7] .......................... A63F 9/24; G06F 17/00; G06F 19/00

(52) U.S. Cl. .......................................... 463/25; 463/16

(58) Field of Search ............................ 463/25, 26, 27, 463/28, 29, 43, 16–20; 90/23

(56) References Cited

U.S. PATENT DOCUMENTS

| | | | |
|---|---|---|---|
| 3,124,674 A | 3/1964 | Edwards et al. | 235/61.1 |
| 3,327,292 A | 6/1967 | Eriksson et al. | |
| 3,487,905 A | 1/1970 | James, Sr. et al. | |
| 3,560,715 A | 2/1971 | Osaka | 235/61.8 |

(List continued on next page.)

FOREIGN PATENT DOCUMENTS

| | | |
|---|---|---|
| AU | 555905 | 10/1986 |
| DE | 34 06058 | 8/1985 |
| DE | 34 41518 | 5/1986 |
| EP | 0 150 103 | 7/1985 |

(List continued on next page.)

OTHER PUBLICATIONS

Laplante, Phillip A. Ed. Comprehensive Dictionary of Electrical Engineering. CRC Press, 1999,pg 15.

Berry, Kathleen M. “Hardware Makers Cash In On America’s Betting Mania,” *The New York Times*, Sep. 16, 1990. (p. F–4).

Boyd, C. “Modern Data Encryption” *Electronics and Communication Engineering Journal*, Oct. 1993 (pp. 271–278).

Declaration of Jeffrey Lindo, dated Jul. 2000.

Denis, A. and Kinsner, W. “Secure and Resilient Data Printed on Paper” Proceedings of the 1999 IEEE Canadian Conference of Electrical and Computer Engineering, (pp. 245–248).

(List continued on next page.)

*Primary Examiner*—Michael O’Neill
*Assistant Examiner*—Julie Brocketti
(74) *Attorney, Agent, or Firm*—Marshall, Gerstein & Borun LLP

(57) ABSTRACT

A gaming system for implementing coinless gaming environment having a central processing system interconnected to a plurality of gaming machines and a plurality of change machines. The central processing system includes a processor and a memory having a plurality of memory locations for storing data. Each memory location is identified by a unique address in memory. In communication with the central processing system are a plurality of gaming machines having an input for accepting encoded media and an input for accepting standard paper currency. The gaming machines also contain an output including a bar code printer for encoding and distributing gaming coupons to a player. The central processing is also in communication with one or more change machines having an input for accepting gaming coupons, an input for accepting paper currency and an output for generating and dispensing encoded gaming coupons and an output for dispensing value either in the form of paper currency and/or coins. By interspersing gaming machines and change machines in a gaming establishment, the gaming establishment can eliminate the use of coins or tokens.

28 Claims, 6 Drawing Sheets

U.S. PATENT DOCUMENTS 3,634,656 A 1/1972 Krechmer et al. ..... 235/61.7 B
3,778,595 A 12/1973 Hatanaka et al. ...... 235/61.7 B
3,786,234 A 1/1974 Trent et al. ............ 235/61.7 R
3,810,627 A 5/1974 Levy ...................... 273/138 A
3,874,584 A 4/1975 Foley ......................... 234/128
3,906,447 A 9/1975 Crafton .................. 340/149 A
3,909,002 A 9/1975 Levy ...................... 273/138 A
3,958,103 A 5/1976 Oka et al. .............. 235/61.8 R
3,984,660 A 10/1976 Oka et al. .............. 235/61.7 B
4,032,946 A 6/1977 Wakatsuki et al. .......... 364/900
4,033,588 A 7/1977 Watts ..................... 273/138 A
4,068,213 A 1/1978 Nakamura et al. ...... 340/149 A
4,072,930 A 2/1978 Lucero et al. ........... 340/152 T
4,108,361 A 8/1978 Krause ....................... 235/375
4,108,364 A 8/1978 Tanaka et al. ............. 235/419
4,114,027 A 9/1978 Slater et al. ................ 235/419
4,124,109 A 11/1978 Bissell et al. ............... 194/4 R
4,200,770 A 4/1980 Hellman et al. .............. 178/22
4,206,920 A 6/1980 Weatherford et al. ... 273/138 A
4,218,582 A 8/1980 Hellman et al. .............. 178/22
4,240,635 A 12/1980 Brown ................... 273/138 A
4,254,404 A 3/1981 White ........................ 340/311
4,275,456 A 6/1981 Tanaka et al. ............. 364/900
4,283,709 A 8/1981 Lucero et al. .......... 340/147 R
4,322,612 A 3/1982 Lange ........................ 235/419
4,323,770 A 4/1982 Dieulot et al. ............. 235/375
4,335,809 A 6/1982 Wain .......................... 194/1 R
4,339,798 A 7/1982 Hedges et al. ............. 364/412
4,373,726 A 2/1983 Churchill et al. ....... 273/138 A
4,405,829 A 9/1983 Rivest et al. ............. 178/22.1
4,467,424 A 8/1984 Hedges et al. ............. 364/412
4,494,197 A 1/1985 Troy et al. .................. 364/412
4,517,558 A 5/1985 Davids ....................... 340/700
4,527,798 A 7/1985 Siekierski et al. ........ 273/86 R
4,531,187 A 7/1985 Uhland ....................... 364/412
4,575,622 A 3/1986 Pellegrini ................... 235/382
4,626,672 A 12/1986 Sapitowicz et al. ......... 235/480
4,636,951 A 1/1987 Harlick ....................... 364/412
4,648,600 A 3/1987 Olliges ................... 273/138 A
4,650,977 A 3/1987 Couch ........................ 235/379
4,669,596 A 6/1987 Capers et al. .............. 194/210
4,669,730 A 6/1987 Small ..................... 273/138 A
4,675,515 A 6/1987 Lucero ....................... 235/381
4,689,742 A 8/1987 Troy et al. .................. 364/412
4,689,757 A 8/1987 Downing et al. ........... 364/550
4,700,296 A 10/1987 Palmer, Jr. et al. ......... 364/401
4,727,544 A 2/1988 Brunner et al. ............... 371/21
4,760,527 A 7/1988 Sidley ........................ 364/412
4,764,666 A 8/1988 Bergeron ................... 235/380
4,775,937 A 10/1988 Bell .......................... 364/412
4,782,468 A 11/1988 Jones et al. ................. 365/229
4,788,419 A 11/1988 Walters et al. ............. 235/381
4,809,837 A 3/1989 Hayashi ...................... 194/205
4,815,741 A 3/1989 Small ......................... 273/138
4,832,341 A 5/1989 Muller et al. ............... 273/139
4,856,787 A 8/1989 Itkis .......................... 273/237
4,875,164 A 10/1989 Monfort ..................... 364/412
4,880,237 A 11/1989 Kishishita ............... 273/138 A
4,882,473 A 11/1989 Bergeron et al. ........... 235/380
4,889,339 A 12/1989 Okada .................... 273/143 R
4,926,327 A 5/1990 Sidley ........................ 364/412
4,930,073 A 5/1990 Cina, Jr. ..................... 364/300
4,937,853 A 6/1990 Brule et al. ................... 379/96
4,963,722 A 10/1990 Takeuchi ................. 235/382.5
5,007,641 A 4/1991 Seidman ................. 273/138 A
5,007,649 A 4/1991 Richardson ................. 273/237
5,010,995 A * 4/1991 Okada ......................... 463/20
5,016,880 A 5/1991 Berge ..................... 273/138 A
5,025,139 A 6/1991 Haliburton, Jr. ............ 235/379
5,038,022 A 8/1991 Lucero ....................... 235/380
5,039,848 A 8/1991 Stoken ....................... 235/381
5,042,809 A 8/1991 Richardson ............. 273/138 A
5,080,364 A 1/1992 Seidman ................. 273/138 A
5,083,271 A 1/1992 Thacher et al. ............. 364/411
5,096,195 A 3/1992 Gimmon ................. 273/138 A
5,113,990 A 5/1992 Gabrius et al. ............. 194/206
5,119,295 A 6/1992 Kapur ........................ 364/412
5,135,224 A 8/1992 Yamamoto et al. ..... 273/143 R
5,159,549 A 10/1992 Hallman, Jr. et al. ....... 364/412
5,179,517 A 1/1993 Sarbin et al. ............... 364/410
5,192,854 A 3/1993 Counts ....................... 235/375
5,197,094 A 3/1993 Tillery et al. ................. 379/91
5,222,583 A 6/1993 Bergmann et al. .......... 194/206
5,223,698 A 6/1993 Kapur ........................ 235/375
5,265,874 A 11/1993 Dickinson et al. ...... 273/138 A
5,277,424 A 1/1994 Wilms .................... 273/85 CP
5,287,269 A 2/1994 Dorrough et al. ........... 364/408
5,290,033 A 3/1994 Bittner et al. ........... 273/138 A
5,297,802 A 3/1994 Pocock et al. .............. 273/439
5,317,135 A 5/1994 Finnocchio ................. 235/375
5,321,241 A 6/1994 Craine ........................ 235/380
5,324,035 A 6/1994 Morris et al. ........... 273/138 A
5,332,076 A 7/1994 Ziegert ....................... 194/217
5,342,047 A 8/1994 Heidel et al. ........... 273/85 CP
5,343,527 A 8/1994 Moore ........................... 380/4
5,348,299 A 9/1994 Clapper, Jr. ............. 273/138 A
5,371,345 A 12/1994 LeStrange et al. .......... 235/380
5,373,440 A 12/1994 Cohen et al. ............... 364/410
5,409,092 A 4/1995 Itako et al. ................. 194/210
5,412,189 A 5/1995 Cragun ....................... 235/379
5,429,361 A 7/1995 Raven et al. ........... 273/138 A
5,440,108 A 8/1995 Tran et al. .................. 235/381
5,457,306 A 10/1995 Lucero ....................... 235/380
5,470,079 A 11/1995 LeStrange et al. ...... 273/138 A
5,475,205 A * 12/1995 Behm et al. ................ 235/375
5,491,326 A 2/1996 Marceau et al. ............ 235/381
5,507,491 A 4/1996 Gatto et al. ................. 273/139
5,536,008 A 7/1996 Clapper, Jr. .................. 463/16
5,551,692 A 9/1996 Pettit et al. ............. 273/143 R
5,559,312 A 9/1996 Lucero ....................... 235/380
5,580,310 A 12/1996 Orus et al. .................... 463/16
5,580,311 A 12/1996 Haste, III .................... 463/29
5,604,801 A 2/1997 Dolan et al. .................. 380/21
5,609,337 A 3/1997 Clapper, Jr. .............. 273/138.2
5,613,680 A 3/1997 Groves et al. ........... 273/138.2
5,625,562 A 4/1997 Veeneman et al. ..... 364/479.05
5,627,356 A 5/1997 Takemoto et al. .......... 235/381
5,628,684 A 5/1997 Bouedec
5,643,086 A 7/1997 Alcorn et al. ................. 463/29
5,645,485 A 7/1997 Clapper, Jr. .................. 463/17
5,650,761 A 7/1997 Gomm et al. ............... 235/381
5,655,961 A 8/1997 Acres et al. .................. 463/27
5,655,966 A 8/1997 Werdin, Jr. et al. ........... 463/25
5,674,128 A 10/1997 Holch et al. .................. 463/42
5,735,432 A 4/1998 Stoken et al. .................. 221/1
5,737,418 A 4/1998 Saffari et al. .................. 380/9
5,741,183 A 4/1998 Acres et al. .................. 463/42
5,749,784 A 5/1998 Clapper, Jr. .................. 463/17
5,752,882 A 5/1998 Acres et al. .................. 463/42
5,753,899 A 5/1998 Gomm et al. ............... 235/381
5,770,533 A 6/1998 Franchi ....................... 463/42
5,800,269 A 9/1998 Holch et al. .................. 463/42
5,810,664 A 9/1998 Clapper, Jr. .................. 463/17
5,811,772 A 9/1998 Lucero ....................... 235/380
5,816,918 A 10/1998 Kelly et al. ................... 463/16
5,820,459 A 10/1998 Acres et al. .................. 463/25
5,839,956 A 11/1998 Takemoto .................... 463/25
5,869,826 A 2/1999 Eleftheriou ................. 235/380
5,902,983 A 5/1999 Crevelt et al. .............. 235/380
5,919,091 A 7/1999 Bell et al. ..................... 463/25
5,923,735 A * 7/1999 Swartz et al. ............ 379/93.12

| | | | | |
|---|---|---|---|---|
| 5,928,082 A | | 7/1999 | Clapper, Jr. | 463/16 |
| 5,949,042 A | | 9/1999 | Dietz, II et al. | 235/375 |
| 5,952,640 A | | 9/1999 | Lucero | 235/380 |
| 5,954,583 A | | 9/1999 | Green | 463/29 |
| 5,959,277 A | | 9/1999 | Lucero | 235/380 |
| 5,984,779 A | | 11/1999 | Bridgeman et al. | 463/16 |
| 6,012,832 A | | 1/2000 | Saunders et al. | 364/410 |
| 6,048,269 A | * | 4/2000 | Burns et al. | 463/25 |
| 6,062,481 A | * | 5/2000 | Storch et al. | 235/494 |
| 6,071,190 A | | 6/2000 | Weiss et al. | 463/25 |
| 6,089,982 A | | 7/2000 | Holch et al. | 463/42 |
| 6,116,402 A | | 9/2000 | Beach et al. | 194/216 |
| 6,280,326 B1 | | 8/2001 | Saunders | 463/25 |
| 6,280,328 B1 | | 8/2001 | Holch et al. | 463/42 |
| 6,340,331 B1 | | 1/2002 | Saunders et al. | 463/25 |

FOREIGN PATENT DOCUMENTS

| | | |
|---|---|---|
| EP | 0 208 857 | 1/1987 |
| EP | 0 534 718 | 3/1993 |
| EP | 0 555 565 | 8/1993 |
| EP | 0 261 222 | 8/1994 |
| GB | 1391060 | 4/1975 |
| GB | 1558521 | 1/1980 |
| GB | 2208737 | 4/1989 |
| JP | 63-502702 | 10/1988 |
| JP | 40-1064681 | 3/1989 |
| JP | 1-277588 | 11/1989 |
| JP | 3-242179 | 10/1991 |
| JP | 4-51982 | 2/1992 |
| JP | 4-53580 | 2/1992 |
| JP | 4-174693 | 6/1992 |
| JP | 4-189384 | 7/1992 |
| JP | 4-338477 | 11/1992 |
| JP | 4-373097 | 12/1992 |
| JP | 5-184724 | 7/1993 |
| WO | 81/01664 | 6/1981 |
| WO | 87/05425 | 9/1987 |
| WO | 92/20415 | 11/1992 |
| WO | WO 98/16910 | 4/1998 |

OTHER PUBLICATIONS

Griffin, Jeffrey A. "Privacy and Security in the Digital Age" IEEE, 1998 (pp. 135–137).

"Kenilworth Systems Corporation" *BARRON'S*, Aug. 4, 1980.

"New Brunswick's Video Lottery Off And Running," *PLAY METER*, Feb. 1991.

Record Display, Software Patent Institute Database of Software Technologies, dated Feb. 6, 2002.

Rosen, Richard, "Video Gambling? You Bet You Can!" *Daily News*, Aug. 4, 1980.

Roulabette Booklet, 1979 (pp. 1–33, 37–42).

"Single Room, Private Bath–and Blackjack?" *The New York Times*, Aug. 21, 1980.

Stockel, Anna "Securing Data and Financial Transactions" IEEE, 1995 (pp. 397–401).

Tannenbaum, Jeffrey A., "New Way to Play: Gambling on Credit In Your Own Room" *The Wall Street Journal*, Jul. 31, 1980.

* cited by examiner

METHOD AND DEVICE FOR IMPLEMENTING A COINLESS GAMING ENVIRONMENT

This is a continuation of U.S. Ser. No. 09/400,378, filed Sep. 21, 1999, which is incorporated herein by reference in its entirety.

BACKGROUND OF THE INVENTION

1. Field of the Invention

The present invention is generally directed to coinless gaming environment, and more particularly, to coinless gaming environment utilizing bar coded gaming coupons.

2. Description of the Related Art

Centralized gaming systems having a plurality of gaming machines connected to a central processing system are well known in the prior art. Typically, these prior art systems include one or more processors managing wagering and credit data for a variety of gaming machines such as slot machines, pinball machines, and video gaming machines. Most prior art gaming machines include a currency acceptor in which a player can insert paper currency, coins or special tokens distributed by the gaming establishment. Upon the insertion of any of these types of currencies, the gaming machine will validate the amount of currency entered into the machine and will grant the player access to the game stored on the gaming machine.

The prior art also discloses gaming systems in which either a central system or an individual gaming machine maintains a credit balance for the gaming machine such that a player can insert an amount of currency more than is required to play a single game and can successively play until the amount entered is depleted. Additionally, the prior art gaming systems also allow a player to accumulate winnings in the credit balance to be used for future plays. Although a player can receive his or her winnings at any time, players typically use their winnings to fund successive plays.

Many of the prior art gaming systems utilize coins or tokens to distribute winnings from play of the games. Upon user initiation of a “cash out,” the gaming machine distributes the currency in an amount equal to the value of credit accumulated by the player. In some instances, the amount of currency stored in the machine may be insufficient to cover the player’s winnings and an attendant must be summoned either to distribute winnings or issue a credit voucher.

The use of coins or tokens in gaming establishments present significant problems to gaming machine players. Because of their physical dimensions, coins are bulky and difficult to transport. Players often are required to carry large containers to transport their winnings from the gaming machines. This type of winnings places burdens on the player in the form of having to carry a typically heavy object over the course of a period of play and to maintain careful watch over the container so as not to lose the winnings. Additionally, the player is exposed to a greater security risk in that an unscrupulous individual can easily ascertain which players have been successful at the gaming machines. Finally, coins or tokens, by the general nature, may be dirty as they are handled by a great number of people throughout a short period of time.

The use of coins or tokens in gaming establishments also present significant problems to the providers of the gaming machines. Gaming machines must be configured to accommodate a sufficient reserve of coins or tokens to provide for a majority of the payoffs to a player. Additionally, in some situations, the gaming machine provider must empty the coins when the machine gets too full. Furthermore, because coins or tokens of different values are typically of different dimensions, each gaming machine must have different inputs to accommodate each value of coin or distinguishing means to accept the variety of dimension coins. Accordingly, because multiple inputs are costly and impractical, some prior art gaming machines limit the denomination of coins which they will accept. Thus, a player wishing to wager a different denomination coin would have to cash out and play another machine. Finally, in terms of the accounting, the gaming machine providers must maintain an inventory of coins or tokens to accommodate player need and must implement additional machinery and personnel to count the coin.

Some of the prior art systems have implemented a system in which game coupons are incorporated into the gaming system. One such system is disclosed in U.S. Pat. No. 5,290,033 to Bittner. The Bittner patent is directed primarily to a gaming machine which dispenses pull-tab game coupons in which the player lifts the tab to determine whether the play is successful. On winning pull-tab game coupons, the value of the amount of winnings is encoded on the coupon to be read by a gaming machine or by a cashier.

The system disclosed in the Bittner patent, and other similar prior art systems, focuses primarily on the value credit won by the player being encoded on the face of the coupon. As such, the central processor in these prior art systems does not participate in dictating the amount of credit represented by each coupon. As mentioned in the Bittner disclosure, encoding the value of credit on the ticket poses significant security risks. The prior art systems address these security concerns by augmenting the system with a secondary encoded random number on the coupon. This secondary random number is referenced to a list in memory which dictates whether the ticket has been cashed in and possibly to verify that the value encoded on the coupon matches a comparison value in memory. Because the prior art system requires both value and security number data, the size of coupon must be sufficiently large to adequately accommodate both numbers or the size of the numbers must be reduced to fit within the area of the gaming coupon. Thus, these system are deficient in effectively providing the most security to the gaming coupon.

Other prior art systems attempt to eliminate the use of coins by the incorporation of magnetic stripe cards or smart cards such as debit or credit cards. Typically, the prior art systems require a user to obtain the card prior to gaming. Because of its inconvenience and because some customers do not feel comfortable providing to a gaming establishment the information necessary to get a card, most of these type of prior art systems only offer the magnetic stripe reader as a feature for some players and most still retain the coin/currency system of the prior art. Thus, these systems have failed to implement a completely coinless gaming environment.

Because of the inconveniences posed to players and gaming establishment in maintaining a coin-based system and because of the problems associated with a value encoded gaming coupon, there is a need for coinless gaming environment incorporating solely an encoded identifier on the gaming media.

SUMMARY OF THE INVENTION

Based on the above-noted deficiencies in the prior art, it is an object of the invention to provide a coinless gaming environment utilizing solely a unique identifier encoded on a gaming media.

This and other objects of the present invention are implemented in a gaming system for implementing coinless gaming environment having a central processing system interconnected to a plurality of gaming machines and a plurality of change machines. The central processing system includes a processor and a memory having a plurality of memory locations for storing data. Each memory location is identified by a unique address in memory. In communication with the central processing system are a plurality of gaming machines. Each gaming machine contains an input for accepting encoded media, which preferably is a gaming coupon, and an optional input for accepting standard paper currency. The gaming machines also contain an output including a bar code printer for encoded and distributing gaming coupons to a player. Finally, the gaming machines include a gaming credit display that allows a player to monitor the status of the amount of credit he or she has won.

The central processing system is also in communication with one or more (or none) change machines. Similar to the gaming machines, the change machines include an input for accepting the gaming coupons, an input for accepting paper currency and an output for generating and dispensing encoded gaming coupons. The change machines also include an output for dispensing value either in the form of paper currency and/or coins.

The system of the present invention is implemented by the central processing system in communication with the gaming machines and the change machines disbursed throughout the gaming environment. To initiate a play, a player can first approach the change machine and insert an appropriate amount of paper currency into the input of the change machine. The change machine reads the value represented by the inserted paper currency and stores the value in a memory location in the central processing system memory. The change machine then generates an encoded gaming coupon having a unique identifier with the address of the memory location in a bar code format on the coupon.

Having been issued a gaming coupon, the player is free to use the gaming coupons to initiate one or more games in a gaming machine. To initiate a play, the player inserts the gaming coupon into the input of a gaming machine. The gaming machine accepts the coupon and reads the unique identifier encoded on the coupon. The central memory then accesses the memory location associated with the identifier and credits an individual gaming machine credit balance with the particular gaming machine an amount equal to the credit value stored in memory. As the player continues to game, the gaming machine credit balance is incremented or decremented. If the player wishes to stop playing that particular gaming machine, the gaming machine generates an encoded gaming coupon by storing the value of the gaming machine credit balance into a different central memory location and generating a gaming coupon with a new unique identifier in bar code format associated with the memory location.

In the event that the player has not exchanged currency for gaming coupons prior to approaching the gaming machines, the present invention also discloses a gaming machine with a paper currency reader which accepts and reads currency and which provides the value of the currency in the individual gaming machine credit balance.

Once the player wishes to receive the cash value encoded in memory, the player can approach any change machine or cashiers station. Similar to initiating a play in a gaming machine, the player inserts the gaming coupon in the change machine input and the unique identifier is read. The appropriate memory location corresponding to the unique identifier is queried and the resulting value stored in memory is dispensed by the change machine.

The system of the present invention implements a coinless gaming environment in which a player is not required to carry bulky coins or tokens. By having a unique identifier encoded on the ticket, the central system can process data quicker and provide security for the system.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE PREFERRED EMBODIMENT

The present invention relates to a method and device for implementing a coinless gaming environment which eliminates the need for any coins or tokens in a gaming establishment.

Figure 1A:
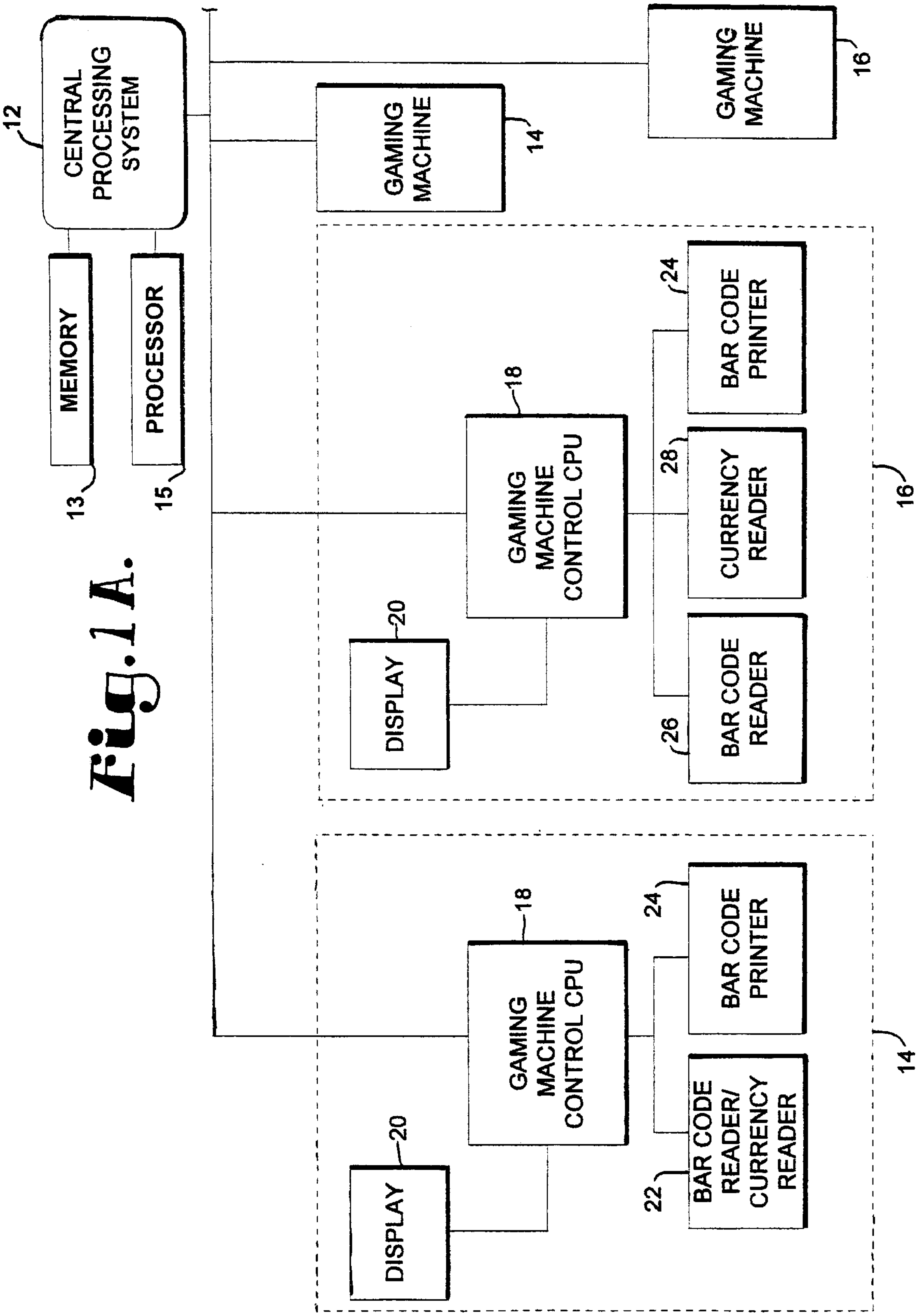
FIG. 1A is block diagram of the coinless gaming system of the present invention.
Figure 1B:
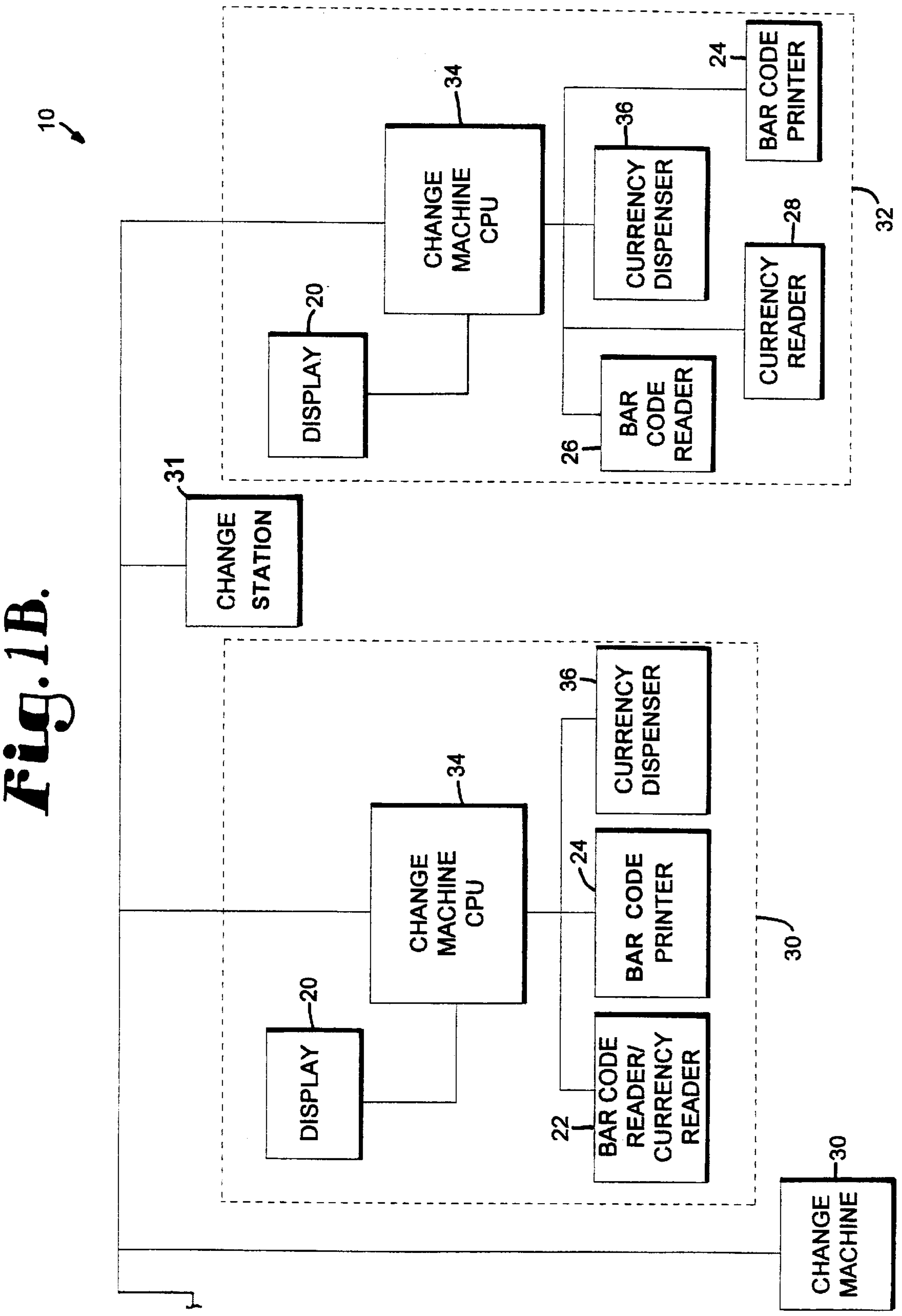
FIG. 1B is block diagram of the coinless gaming system of the present invention.

FIGS. 1A and 1B denote block diagrams of the coinless gaming system of the present invention, designated generally by the reference numeral 10. The gaming system 10 preferably includes a central processing system 12 which is in communication with a plurality of gaming machines 14, 16 and one or more change machines 30, 32. The central processing system 12 preferably includes a central memory 13 having a plurality of memory locations identifiable by their address and a processor for communication with various machines along the system. In the preferred embodiment, central memory 13 is a non-volatile memory source. As would be understood by someone skilled in the relevant art, several types of memory would be considered within the scope of the present invention. Processor 15 is preferably a stand alone computer system whose processing and communications capabilities vary with the size and demands of the gaming system 10.

In communication with central processing system 12 are a plurality of gaming machines 14, 16. The present invention discloses two embodiments of gaming machines, who share identical functions, and are only different with respect to a structural variation. In the first embodiment, gaming machine 14 includes gaming machine processor 18, credit display 20, combined bar code reader/currency reader 22, and bar code printer 24. Gaming machine processor 18 can include a variety of processors necessary to establish communication with central processing system 12 and to carry out the functions of the particular games. Credit display 20 is a standard display unit for electronically displaying a number representative of the amount of credit a player has accumulated. Combined bar code reader/currency reader 22 is a single unitary unit which can accept and read either an encoded media or paper currency. One such reader is disclosed in U.S. Pat. No. 5,290,033 to Harold Bittner and is incorporated herein by reference. Finally, bar code printer 24 is a printing unit for generating data and symbols of a variety of media, preferably a paper stock. Such units are commonly known throughout the relevant art. As would be understood, bar code printer 24 would vary with the type of printing media (i.e., paper stock, laminate) and with the printing method (i.e., text, magnetic).

In an alternative embodiment, gaming machine 16 includes the gaming machine processor 18, the credit display 20 and the bar code printer 24. However, the gaming machine 16 does not include a combined bar code reader/currency reader 22, but incorporates a separate bar code reader 26 and currency reader 28. Although structurally different, the function of gaming machine 14 and gaming machine 16 does not vary. As a third embodiment, gaming machine 16 may also be limited solely to a bar code reader 26 as an input. Finally, gaming machine 16 may also include partially or wholly preprinted coupons in lieu of, or in combination with, bar code printer 24.

Figure 2:
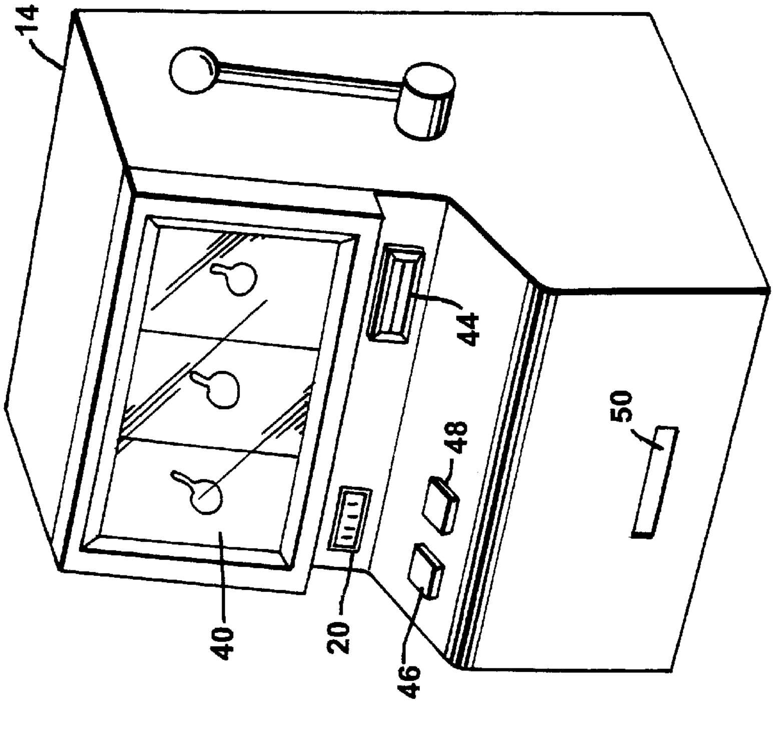
FIG. 2 is representative of a gaming machine implemented in the coinless gaming system of the present invention.

FIG. 2 is representative of a preferred gaming machine 14. In this embodiment, gaming machine 14 includes a video screen 40, display 20, input 44, buttons 46, 48 and output 50. Preferably, the gaming machine 14 is a video gaming machine or a mechanical reel gaming machine. As would be understood, any variety of gaming machines could be utilized with the present invention, including but not limited to slot machines, poker machines, keno machines, instant lottery machines, lottery machines and any other type of gaming machine. Video screen 40 is typically understood in the general art to generate the game to be implemented by the gaming machine 14. Display 20 electronically represented a numeral reflecting an amount of credit accounted to the player playing the game. Input 44 coincides with combined bar code reader/currency reader 22 by offering a single opening for a player to insert a variety of payment means. Gaming machine 14 can include a variety of buttons 46, 48. Preferably, there is a cash out button 46 and a pay with credit 48 on gaming machine 14. As would be understood, any touch screen display eliminating the need for buttons would be considered within the scope of the present invention. Output 50 coincides with bar code printer 24 to allow a printed media to exit the gaming machine.

As would be understood, gaming machine 16 (not pictured) would have similar structures for the video screen 40, display 20, buttons 46, 48, but would include an additional input slot to accommodate the two inputs. Furthermore, gaming machine 16 could also accommodate any additional inputs such as magnetic cards, free-play coupons or any other additional coded media.

Also in communication with the central processing system 12 are one or more change machines 30, 32 or change station 33. The present invention also discloses two embodiments of the change machine who have some structural differences, but have identical functions. In the first embodiment, the change machine 30 includes change machine processor 34, display 20, combined bar code reader/currency reader 22, bar code printer 24 and currency dispenser 36. Change machine processor 34 can include a variety of processors necessary to establish communication with the central processing system 12 and carry out the function of the change machine. Currency dispenser 36 includes any standard gaming dispenser which can output paper currency and/or coins upon receipt of an appropriate input signal.

In a second embodiment, change machine 32 includes change machine processor 34, credit display 20, currency dispenser 36 and bar code printer 24, but incorporates a separate bar code reader 26 and currency reader 28. Although structurally different, the function of change machine 30 and change machine 32 does not vary.

Figure 3:
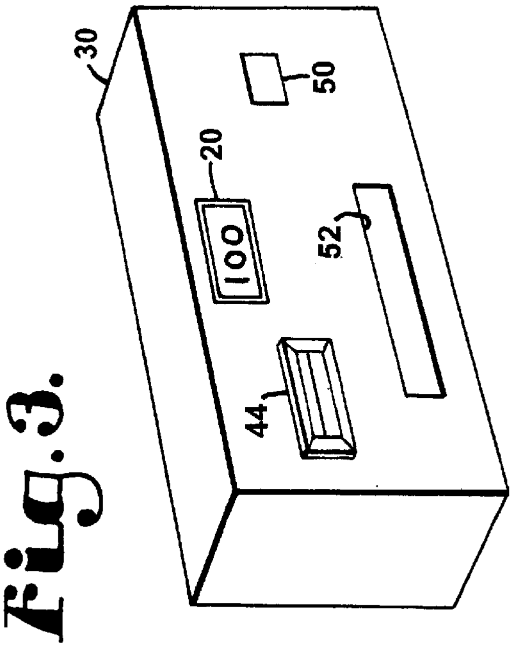
FIG. 3 is representative of a change machine implemented in the coinless gaming system of the present invention.

FIG. 3 is representative of the preferred change machine 30. In this embodiment, change machine 30 includes input 44, credit display 20, currency output 52 and encoded ticket output 50. Change machine 30 is designed to be implemented remotely from the gaming machines, but interspersed throughout a gaming establishment to allow players access to cash in money and to cash out winnings. As would be understood, change machine 30 can also be integrated into a gaming machine 14, 16 as a single machine. Change machine 32 (not pictured) would have similar structures in the display 20, currency dispenser 52 and encoded ticket output 50, but would include an additional input slot to accommodate the two inputs.

With reference to FIG. 1B, central processing system 12 may also be in communication with change station 31. Change station 31 includes combined bar code reader/currency reader 22 and bar code printer 24, or the separate variations, but would require an attendant to accept cash for tickets or dispense winnings as is known in the prior art. As would be understood, change station 31 may be implemented into the gaming system 10 as a substitute or in conjunction with change station 30, 32.

Preferably, central processing system 12 is in communications with any permutation of gaming machines 14, 16, change machines 30, 32 and/or change stations 31. In the preferred embodiment, communications are established via preexisting communication components and protocols. As would be understand a dedicated communications link to implement the coinless gaming environment of the present invention would be considered within the scope of the present invention.

Figure 4:
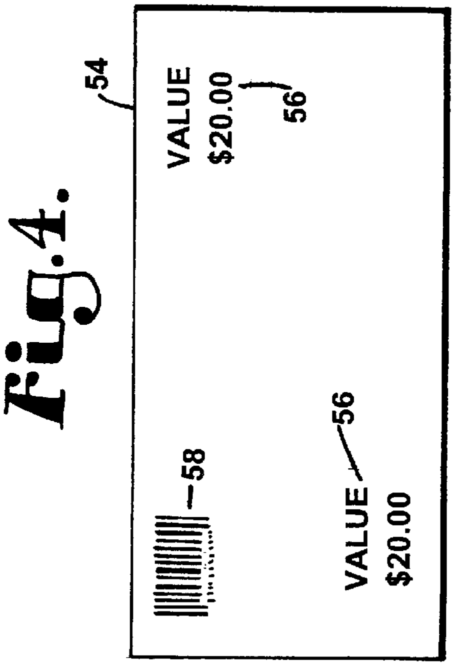
FIG. 4 is representative of an encoded gaming coupon of the present invention.

FIG. 4 is representative of the preferred encoded media of the present invention, referenced generally by gaming coupon 54. Gaming coupon 54 is preferably constructed of a paper stock which can accept printing from bar code printing and is of a rectangular dimension that can be easily handled by a player. As would be understood, different dimensions and sizes of gaming coupon 54 would be considered with the scope of the present invention.

In the preferred embodiment, gaming coupon 54 includes a variety of printed text 56 on one or more faces of the coupon 54. Printed text 56 can include visual indications of the amount of credit the user has accumulated, trademarks or logos from the gaming establishment and any other customized marketing messages. Although used to relay information to the player from the gaming establishment, printed text 54 is not utilized as a primary information source for the coinless gaming system 10.

Also located on the face of the gaming coupon 54 are at least one area of encoded text and/or numerals, which preferably is a bar code 58. Bar code 58 contains a single unique identifier, which can be printed as a single bar code row or as a combination of bar codes. Bar code 58 contains the primary information source for the coinless gaming system 10.

Figure 5:
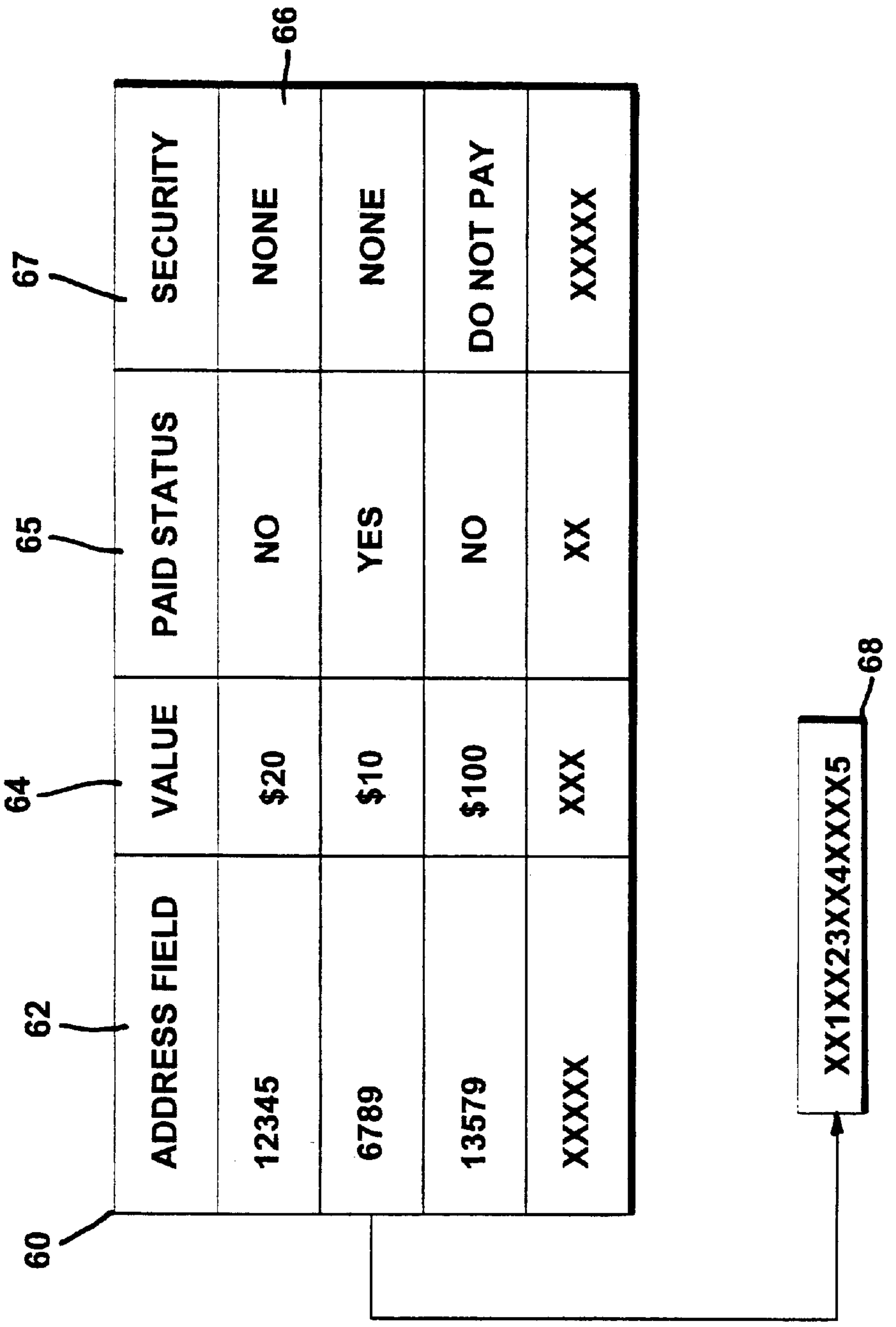
FIG. 5 is representative of a memory array utilized by the coinless gaming system of the present invention.

FIG. 5 is representative of memory array 60 utilized by the coinless gaming system 10. Memory 13 is organized into memory array 60 having a plurality of memory locations characterized by one or more fields. As illustrated in FIG. 5, memory array 60 includes an address field 62, value field 64, paid status field 65 and security field 67 as columns and various rows 66 of inputted data. Preferably, the memory array 60 is indexed by address field 62, such that the remaining fields in the array 60 are referenced to address field 66. As would be understood, memory array 60 can include additional fields such as terminal identification, time/date, player identification or other demographic data. Additionally, array 60 may be single sorted table or a relational database indexed by address field 66.

With continued reference to FIG. 5, address field 62 corresponds to bar code 58. In the preferred embodiment, address field 62 is encrypted into a numerical sequence as illustrated at 68. Numerical sequence 68 is preferably a number larger than address field 66 for security purposes. As would be understood, there are a variety of encryption methods that would be considered within the scope of the present invention. In an alternative embodiment, numerical sequence 68 is a unique random number which is associated with address field 62 via a relational database.

Figure 6:
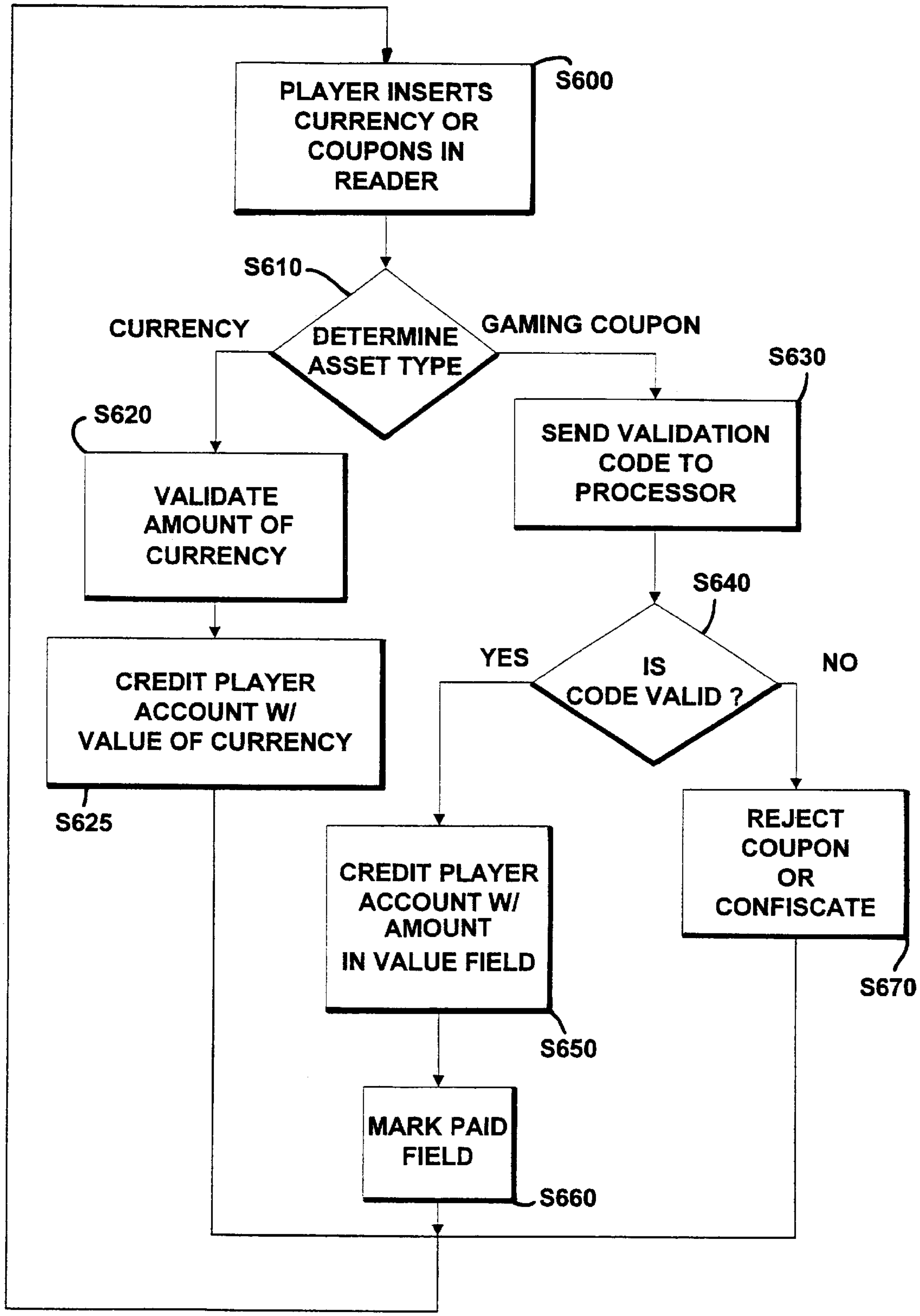
FIG. 6 is flow diagram of the input processes utilized by the gaming machine of the present invention.

FIG. 6 is a flow diagram of the input process utilized by gaming machines 14, 16. In Step S600, a player inserts either currency or gaming coupon 54 into reader 22. At Step S610, the reader determines whether the inputted media is currency or a coupon 54. If the media is currency, the reader validates the appropriate amount represented by the currency in Step S620. After validating the currency, the value of currency is transferred to central processing system 12 as credit to gain access to the game in Step S625.

If at Step S610, reader 22 determines that the inputted media is a gaming coupon 54, reader 22 reads bar code 58 from coupon 54 and transfers numerical sequence 68 to central processing system 12 in Step S630. Upon receiving numerical sequence 68 decoded from bar code 58, in Step S640 central processing system 12 determines if numerical sequence 68 is a valid code. If numerical sequence 68 is valid, value field 64 is added to the gaming machine credit balance to gain access to the game in Step S650. Furthermore, in Step S660, the paid field 70 is marked as positive to prevent further payment of the coupon 54. If at Step S640, numerical sequence 68 is not valid, central processor 12 directs gaming machine 14, 16 to display an error message in Step S670. At this point, the entire process resets for the next input.

Figure 7:
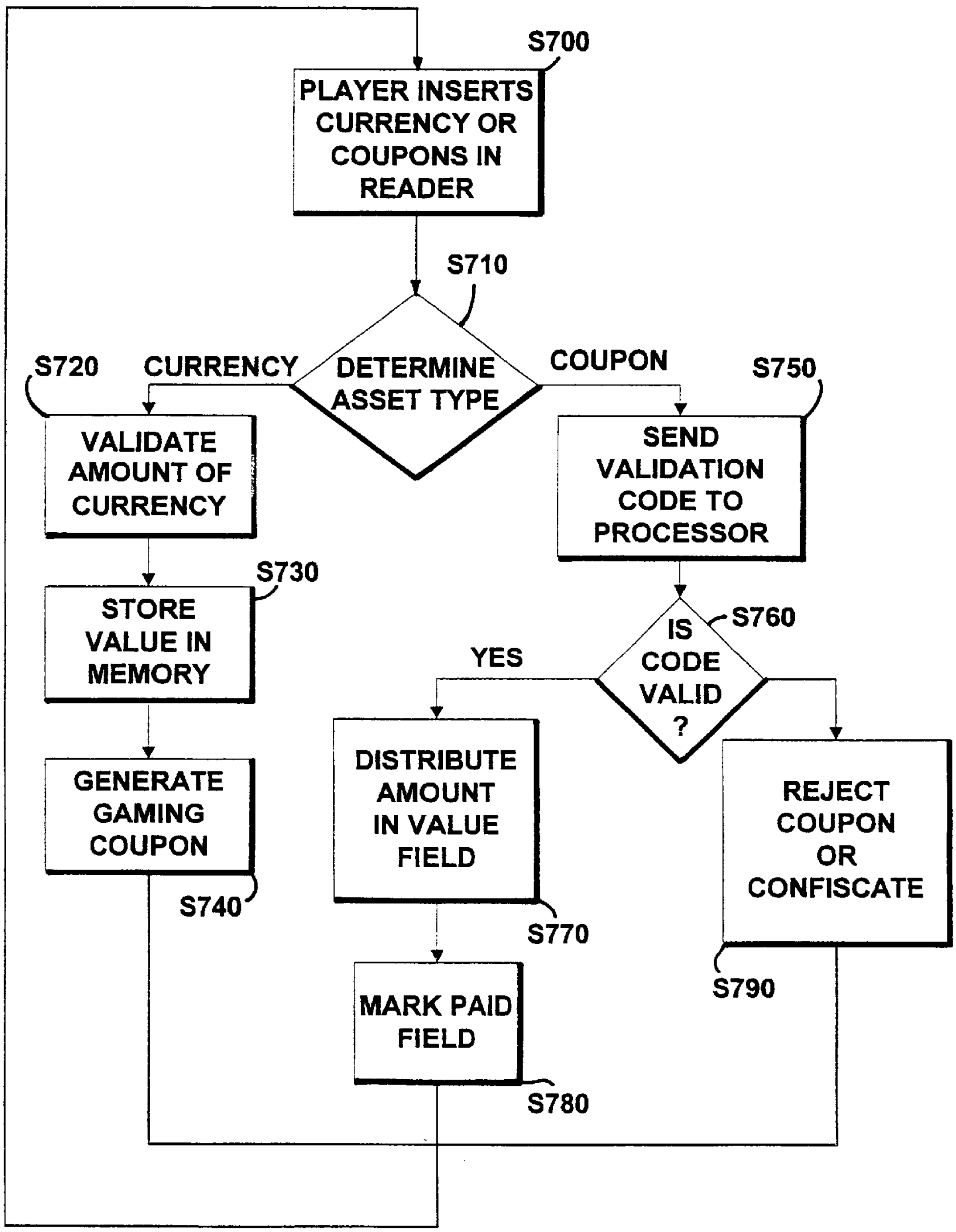
FIG. 7 is a flow diagram of the input process utilized by the change machine of the present invention.

FIG. 7 is a flow diagram of the input processes utilized by change machines 30, 32. In Step S700, a player inserts either currency or gaming coupon 54 into reader 22. At Step S710, reader 22 determines whether the inputted media is currency or gaming coupon 54. If the media is currency, reader 22 validates the appropriate amount represented by the currency in Step S720. After validating the currency, the value of the currency is stored in memory 13 in Step S730 and a gaming coupon 54 is generated with a unique identifier encoded thereon in Step S740.

If at Step S710, reader 22 determines that the inputted media is a gaming coupon 54, reader 22 reads bar code 58 from the coupon 54 and transfers numerical sequence 68 to central processing system 12 in Step S750. Upon receiving numerical sequence 68 from bar code 58, in Step S760 central processing system 12 determines if numerical sequence 68 is a valid code. If numerical sequence 68 is valid, change machine 30, 32 distributes currency in the amount equal to value field 64 in Step S770. Furthermore, in Step S780, the paid field 70 is marked as positive to prevent further payment of the coupon 54. If at Step S760, the numerical sequence 68 is not valid, central processing system 12 directs change machine 30, 32 to display an error message in Step S790. At this point, the entire process resets for the next input.

The invention is considered to have been described in such full, clear, concise and exact terms as to enable a person of ordinary skill in the art to make and use the same. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit and scope of the invention. The specification and drawings are, therefore, to be regarded in an illustrative rather than restrictive sense. Accordingly, it is not intended that the invention be limited except as may be necessary in view of the appended claims or their equivalents, which particularly point out and distinctly claim the subject matter applicant regards as its invention.

I claim:

1. A gaming system comprising:

a gaming machine including a display unit, a currency reader, a bar code printer, and a machine processor coupled to the display unit, the currency reader and the bar code printer, the gaming machine programmed to cause a video image representing a game to be generated on the display unit; and a central processing system including a central processing system processor and a memory, the central processing system in communication with the gaming machine, the currency reader determines a value amount of currency received, the gaming machine transfers the value amount to the central processing system;

the central processing system stores the value in a player value balance with a memory address associated therewith;

the central processing system encrypts the memory address to define an encrypted memory address;

the central processing system transfers the encrypted memory address to the gaming machine, and the bar code printer prints the encrypted memory address as a bar code on a media.

2. The gaming system according to claim 1, wherein the gaming machine causes a video image representing a game to be generated on the display unit, said video image representing one of the following games: slots, poker, or keno.

3. The gaming system according to claim 2, wherein the gaming machine causes a video image comprising an image of a plurality of slot machine reels representing a slots game to be generated on the display unit.

4. The gaming system according to claim 1, wherein the central processing system encrypts a memory address from a numerical address having a first number of digits by generating an encrypted memory address having a second number of digits, the second number of digits being greater than the first number of digits.

5. The gaming system according to claim 1, wherein the gaming machine comprises a bar code reader, and the bar code reader reads a bar code printed on a media to determine an encrypted memory address;

the gaming machine transfers the encrypted memory address to the central processing system;

the central processing system determines if the encrypted memory address is valid; and the central processing system accesses the player value balance associated with the memory address if the encrypted memory address is valid.

6. The gaming system according to claim 5, wherein the currency reader and the bar code reader are combined.

7. The gaming system according to claim 5, wherein:

the central processing system stores a paid status field associated with the memory address and the player value balance in the memory;

the central processing system accesses the player value balance associated with the memory address if the encrypted memory address is valid;

the gaming machine provides value to the player according to the player value balance; and the central processing system stores a positive payment in the paid status field in the memory.

8. The gaming system according to claim 7, wherein the gaming machine provides a payout to the player according to the player value balance.

9. The gaming system according to claim 7, wherein the gaming machine provides game play to the player according to the player value balance.

10. The gaming system according to claim 7, wherein the central processing system provides an error message if the encrypted memory address is not valid.

11. The gaming system according to claim 1, further comprising:

a change machine including a currency reader, a bar code printer, and a change machine processor coupled to the currency reader and the bar code printer, the currency reader of the change machine determines a value amount of currency received, the change machine transfers the value amount to the central processing system;

the central processing system stores the value in a player value balance with a memory address associated therewith;

the central processing system encrypts the memory address to define an encrypted memory address;

the central processing system transfers the encrypted memory address to the change machine, and the bar code printer of the change machine prints the encrypted memory address as a bar code on a media.

12. The gaming system according to claim 11, wherein the change machine comprises a bar code reader and a currency dispenser, and the bar code reader of the change machine reads a bar code printed on a media to determine an encrypted memory address;

the change machine transfers the encrypted memory address to the central processing system;

the central processing system determines if the encrypted memory address is valid;

the central processing system accesses the player value balance associated with the memory address if the encrypted memory address is valid; and the currency dispenser of the change machine provides value in the amount of the player value balance to the player.

13. The gaming system according to claim 12, wherein the currency reader and the bar code reader of the change machine are combined.

14. The gaming system according to claim 12, wherein:

the central processing system stores a paid status field associated with the memory address and the player value balance in the memory;

the central processing system accesses the player value balance associated with the memory address if the encrypted memory address is valid;

the change machine provides value to the player according to the player value balance; and the central processing system stores a positive payment in the paid status field in the memory.

15. A gaming system comprising:

a gaming machine including a display unit, a bar code reader, and a gaming machine processor coupled to the display unit, the currency reader and the bar code reader, the gaming machine programmed to cause a video image representing a game to be generated on the display unit; and a central processing system including a central processing system processor and a memory, the central processing system in communication with the gaming machine, bar code reader reads a bar code printed on a media to determine an encrypted memory address;

the gaming machine transfers the encrypted memory address to the central processing system;

the central processing system determines if the encrypted memory address is valid;

the central processing system accesses a player value balance associated with the memory address if the encrypted memory address is valid; and the central processing system adds the value in the player value balance to a gaming machine credit balance to permit access to the game.

16. The gaming system according to claim 15, wherein the gaming machine causes a video image representing a game to be generated on the display unit, said video image representing one of the following games: slots, poker, or keno.

17. The gaming system according to claim 15, wherein the gaming machine causes a video image comprising an image of a plurality of slot machine reels representing a slots game to be generated on the display unit.

18. The gaming system according to claim 15, wherein the central processing system encrypts a memory address from a numerical address having a first number of digits by generating an encrypted memory address having a second number of digits, the second number of digits being greater than the first number of digits.

19. The gaming system according to claim 15, wherein the gaming machine comprises a currency reader and a bar code printer coupled to the gaming machine processor, and the currency reader determined a value amount of currency received, the gaming machine transfers the value amount to the central processing system;

the central processing system stores the value in a player value balance with a memory address associated therewith;

the central processing system encrypts the memory address to define an encrypted memory address;

the central processing system transfers the encrypted memory address to the gaming machine processor, and the bar code printer prints the encrypted memory address as a bar code on a media.

20. The gaming system according to claim 19, wherein the currency reader and the bar code reader are combined.

21. The gaming system according to claim 19, wherein:

the central processing system stores a paid status field associated with the memory address and the player value balance in the memory;

the central processing system accesses the player value balance associated with the memory address if the encrypted memory address is valid;

the gaming machine provides value to the player according to the player value balance; and the central processing system stores a positive payment in the paid status field in the memory.

22. The gaming system according to claim 21, wherein the gaming machine provides a payout to the player according to the player value balance.

23. The gaming system according to claim 21, wherein the gaming machine provides game play to the player according to the player value balance.

24. The gaming system according to claim 21, wherein the central processing system provides an error message if the encrypted memory address is not valid.

25. The gaming system according to claim 21, further comprising:

a change machine including a currency reader, a bar code printer, and a change machine processor coupled to the currency reader and the bar code printer, the currency reader of the change machine determines a value amount of currency received, the change machine transfers the value amount to the central processing system;

the central processing system stores the value in a player value balance with a memory address associated therewith;

the central processing system encrypts the memory address to define an encrypted memory address;

the central processing system transfers the encrypted memory address to the change machine processor, and the bar code printer prints the encrypted memory address as a bar code on a media.

26. The gaming system according to claim 25, wherein the change machine comprises a bar code reader and a currency dispenser, and the bar code reader of the change machine reads a bar code printed on a media to determine an encrypted memory address;

the change machine transfers the encrypted memory address to the central processing system;

the central processing system determines if the encrypted memory address is valid;

the central processing system accesses the player value balance associated with the memory address if the encrypted memory address is valid; and the currency dispenser of the change machine provides value in the about of the player value balance to the player.

27. The gaming system according to claim 26, wherein the currency reader and the bar code reader of the change machine are combined.

28. The gaming system according to claim 26, wherein:

the central processing system stores a paid status field associated with the memory address and the player value balance in the memory;

the central processing system accesses the player value balance associated with the memory address if the encrypted memory address is valid;

the change machine provides value to the player according to the player value balance; and the central processing system stores a positive payment in the paid status field in the memory.

* * * * *